UNITED STATES PATENT OFFICE.

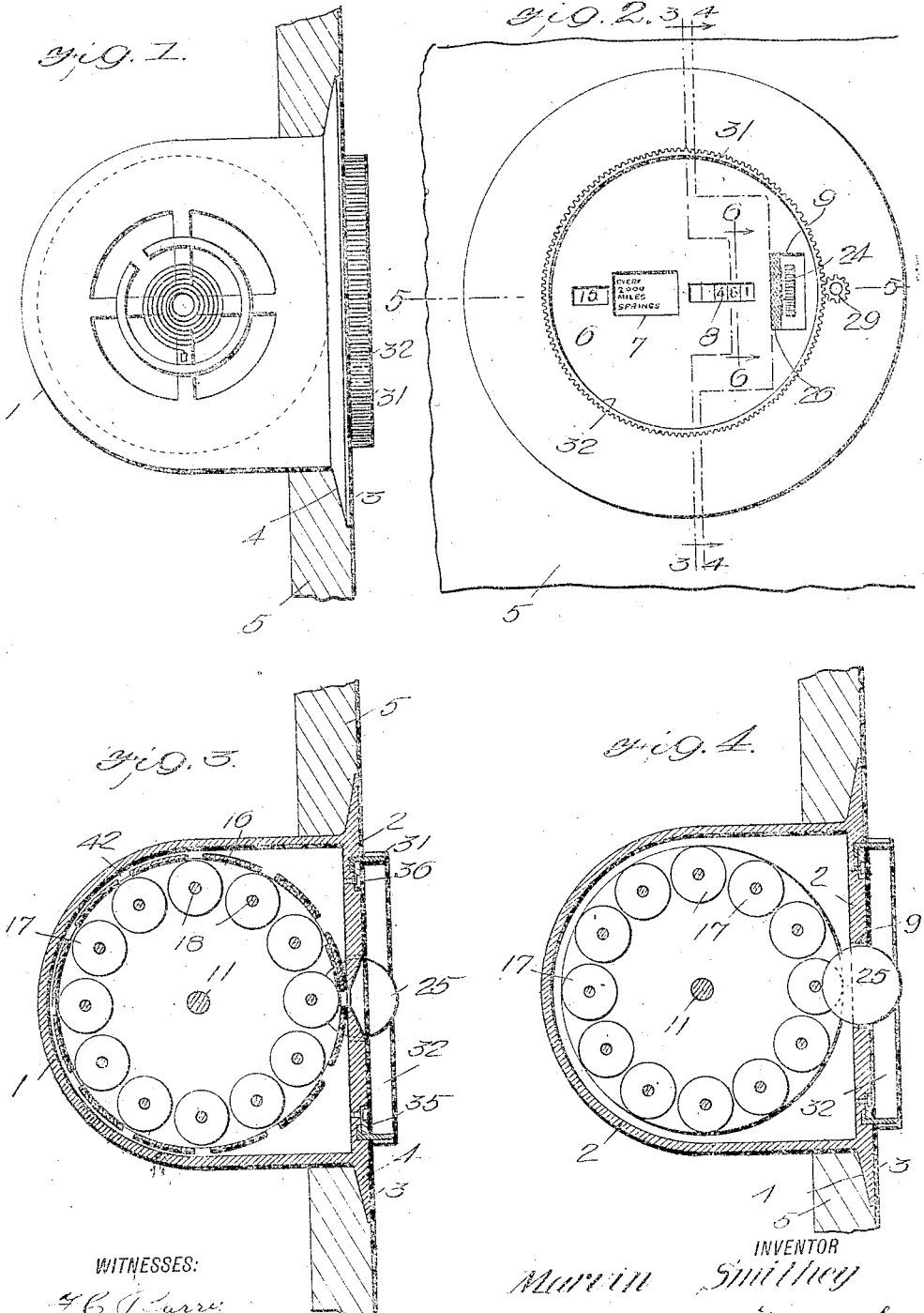

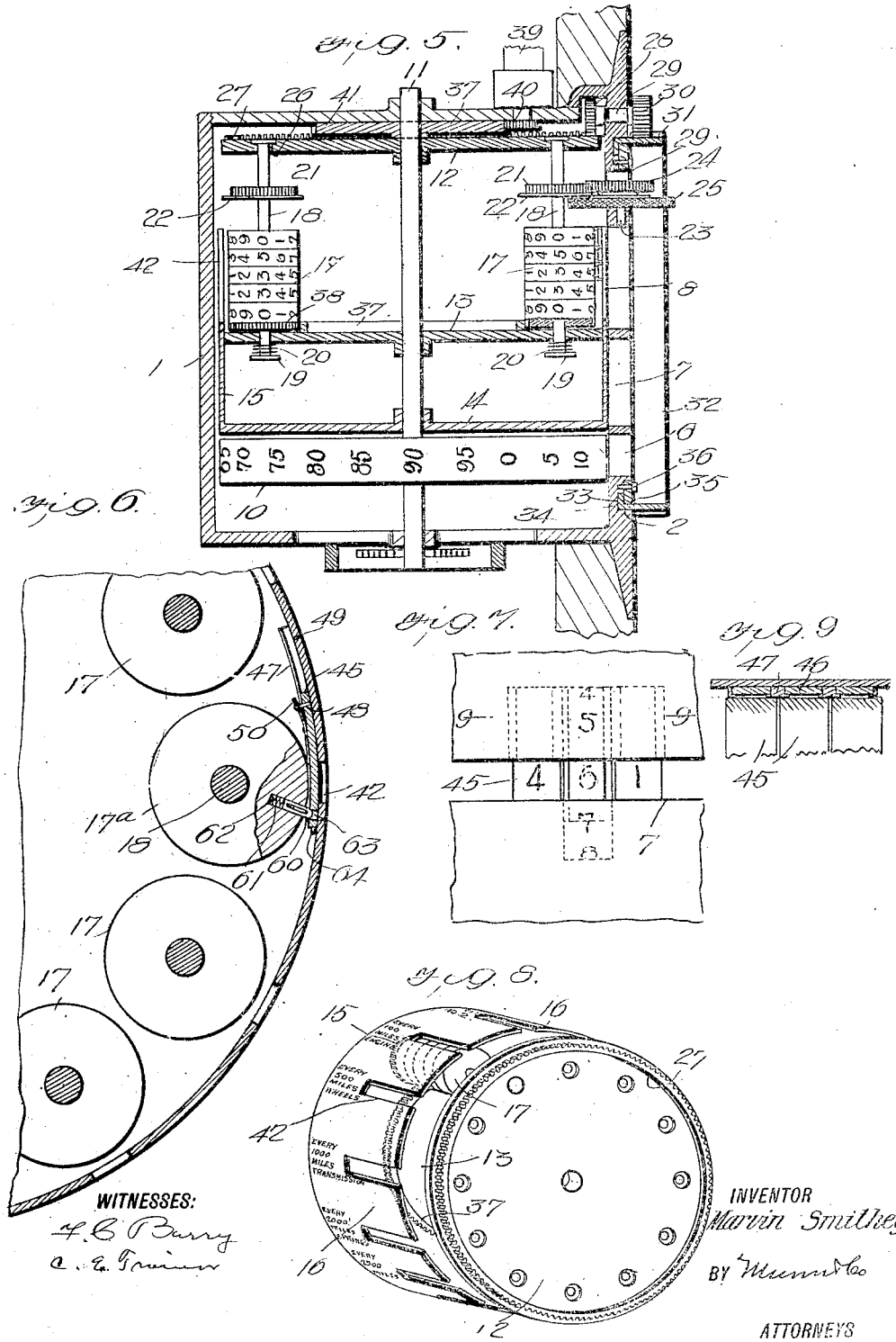

MARVIN SMITHEY, OF LAWRENCEVILLE, VIRGINIA.

COMBINED ODOMETER AND INDICATORS.

1,199,625.  Specification of Letters Patent.  Patented Sept. 26, 1916.

Application filed October 30, 1915.  Serial No. 58,808.

*To all whom it may concern:*

Be it known that I, MARVIN SMITHEY, a citizen of the United States, and a resident of Lawrenceville, in the county of Brunswick and State of Virginia, have invented certain new and useful Improvements in Combined Odometers and Indicators, of which the following is a specification.

My invention is an improvement in combined odometer and indicators, and the invention has for its object to provide a device of the character specified, adapted for use with motor vehicles, wherein a speedometer is provided for indicating the rate of speed, and a series of odometers having means for identifying each with a part of the vehicle, as for instance, the tires, the transmission, the differential, the fuel, the oil, the total mileage, and the trip mileage, all being driven from the same shaft that drives the speedometer, and wherein a rotatable support is provided for the odometers, and means for rotating the same to permit any predetermined odometer to be brought into reading position.

A further object is to provide mechanism in connection with another odometer for indicating to the driver the necessity of attending to certain necessary details in the operation of the vehicle, as for instance, replenishing the fuel at the end of a certain number of miles of travel, or the replenishing of the oil, the packing of the differential or the transmission with grease, and like details of operation, by displaying at the reading face of the device a signal of warning.

In the drawings: Figure 1 is a side view of the device; Fig. 2 is a front view; Figs. 3, 4, 5 and 6 are sections on the lines 3—3, 4—4, 5—5 and 6—6, respectively, of Fig. 2, Figs. 3 and 4 looking in the direction of the arrows adjacent to the two lines, Fig. 5 looking in the direction of the arrows adjacent to the line, and Fig. 6 being an enlarged section; Fig. 7 is a front view of a portion of Fig. 6 at the reading aperture; Fig. 8 is a perspective view of the rotatable support detached; Fig. 9 is a section on the line 9—9 of Fig. 7.

In the present embodiment of the invention, a casing 1 is provided of approximately cylindrical form, but having at one side a plane face or wall 2 which is the front of the casing, the said face being circular in outline and having a marginal flange 3 which is beveled on its inner face, as indicated at 4.

The casing 1 is adapted to be held in an opening in the dashboard 5 of the vehicle, the flange 3 being countersunk in such manner that the outer face of the wall 2 is flush with the face of the dashboard. This face or wall 2 is provided with three slots 6, 7 and 8, respectively, arranged with their long axes in alinement, and on a diameter of the face or wall 2, and with a fourth slot 9 which is arranged with its long axis vertical and with its short axis in the same diameter as the long axes of the openings 6, 7 and 8. These openings 6, 7 and 8 are reading openings, while the opening 9 is for giving access to the working parts of the device.

The speedometer indicated generally at 10 is of any usual or desired construction, and the said speedometer is secured to the shaft 11 which is journaled diametrically of the casing 1, and parallel with the long axes of the openings 6, 7 and 8. A rotatable support is mounted on this shaft, and this support carries the series of odometers.

The support consists of three disks, 12, 13 and 14, each having a hub journaled on the shaft, and the disks 13 and 14 are connected by a cylindrical web 15, which has extensions 16 extending toward the disk 12. The odometers 17 and 17ᵃ are of ordinary construction, and in the present instance there are eleven odometers 17 and one odometer 17ᵃ, the said odometers being however precisely alike, in construction, and the odometers 17 are identified with the tires, namely the four in use and the extra tire, the transmission, the differential, the oil, the fuel, the total mileage, and the trip mileage, while the odometer 17ᵃ is an indicating odometer whose purpose will be presently set forth.

Each odometer 17 and 17ᵃ is supported by a shaft 18, and these shafts are journaled in the disks 12 and 13. Each shaft has a head 19 between the disks 13 and 14, and a coil spring 20 is arranged between each head and the disk 13, for a purpose to be presently described, the shafts 18 being slidable longitudinally in their bearings in the disks 12 and 13.

At the end adjacent to the disk 12, each shaft 18 is provided with a gear wheel 21, having at that face adjacent to the odometer indicated at 17 a radial annular flange 22.

A stub shaft 23 is journaled in the wall 2 in the opening 9, and this shaft has a gear wheel 24 which is adapted to mesh with the gear wheels 21 in succession under circumstances to be presently described, and a knurled wheel 25 is also secured to the stub shaft. These wheels 24 and 25 extend beyond the outer face of the wall 2 into position such that the periphery of the knurled wheel may be engaged to rotate the stub shaft or to move the said stub shaft longitudinally, for it is mounted to be moved longitudinally, within the limits prescribed by the length of the opening 9. It will be understood that any odometer 17 or 17ª may be disconnected from its shaft 18 by moving the said shaft longitudinally against the resistance of the spring 20, and when the shaft is released, the spring will return the shaft to normal position, and will clutch it to the number or counting wheels. At the opposite end from the head 19, each shaft 18 has a head 26, which is normally received in a recess or counterbore at the outer face of the disk 12, and the heads 26 limit the movement of the shafts 18 under the influence of the springs 20.

When the rotatable support for the odometers is rotated by mechanism to be presently described, the odometers will be brought in succession to the reading opening 8, through which the numerals on the number or counting wheels may be read, and when they are in reading position, the gear wheel or pinion 21 of each odometer, or of each shaft 18, will be in mesh with the gear wheel 24 of the stub shaft. The flange 22 of the gear wheel will be between the gear wheel 24 and the knurled wheel 25, and the adjacent face of the knurled wheel will bear against the adjacent face of the wheel 21. When now the shaft 23 is moved longitudinally by pressing the knurled wheel laterally, the shaft 18 will be moved longitudinally, against the resistance of the spring 20, to disconnect the shaft 18 from its driving mechanism, to permit the particular odometer in question to be reset. Because of this arrangement each odometer may be reset when it is in reading position, by moving the knurled wheel 25 first laterally and then rotating the said wheel in the proper direction.

The rotatable support is rotated, through a gear ring 27, which is secured to the outer face of the disk 12, and a pinion 28 on a stub shaft 29 journaled transversely of the wall 2 is normally in mesh with the gear wheel. This stub shaft 29 is provided with a pinion 30 at the outer face of the wall 2, and an annular series of gear teeth 31 on a ring 32 journaled on the wall 2 mesh with the pinion 30, in such manner that when the ring 32 is rotated the stub shaft 29 will be rotated and the rotatable support for the odometers will also be rotated to bring the odometers in succession into reading position. This ring 32 is provided with an inwardly extending flange 33 at its inner edge, and this flange is received in an annular recess 34 in the outer face of the wall 2 and concentric with the said wall. The recess 33 is enlarged internally or counterbored, to receive a ring 35, the outer face of the ring being flush with the outer face of the wall 2, and the outer edge of the ring extends over the flange 33, to rotatably hold the ring 32 in place.

The ring 35 is held in place by screws 36 or the like, the said screws passing through openings in the ring and engaging threaded openings in the wall 2. It will be evident that when the ring 32 is rotated by grasping the same, the stub shaft 29 will be rotated through the engagement of the gear teeth 31 with the pinion 30, and the rotatable support for the odometers will also be rotated through the engagement of the pinion 28 with the gear ring 27. The odometers are driven in synchronism by means of a gear wheel 37, secured to the shaft 11 adjacent to the disk 13, and meshing with gear wheels or pinions 38 on the respective odometer shafts 18. This gear wheel 37 meshes with the pinions of all of the shafts 18, and it will be evident that when the shaft 11 is rotated, the speedometer and all the odometers will be driven in synchronism.

The shaft 11 is driven through a flexible shaft 39 adapted to be connected with one of the wheels of the vehicle in the usual manner, and one end of the shaft 39 is journaled in that end of the casing 1 adjacent to the disk 12. The inner end of the shaft 39 is provided with a pinion 40, which meshes with a gear wheel 41 secured to the shaft 11 between the disk 12 and the adjacent head of the casing 1.

When the motor vehicle is in motion, the shaft 39 will be rotated in the usual manner, and through the gear wheel 41 and pinion 40 the shaft 11 will be rotated, and the odometers will be driven at the same rate of speed, because of the fact that all of the pinions or gear wheels 38 are of the same size and mesh with the common gear wheel 37.

The indications on the speedometer 10 may be read through the reading opening 6 in the head 2, the said opening being provided for this purpose. The indications on the several odometers may be read through the reading opening 8, the said opening being provided for that purpose. The opening 7 is provided for permitting the identifying legends 44 of the odometers to be read, and these legends appear at this opening. The legends are on the periphery of the web 15, and it will be noticed that the peripheral surface of the said web moves past the reading opening 7, so that when the odometers are brought in succession into reading position, at that moment when each odometer comes into reading position, at the same moment the legend identifying the said odometer comes into position at the opening 7, so that the indication on the odometer and the identifying legend on the odometer may be simultaneously read. These legends are as follows: Tire number one. Tire number two. Tire number three. Tire number four. Extra tire. Transmission. Differential. Oil. Fuel. Total mileage. Trip mileage.
When it is desired to bring any predetermined odometer into reading position, it is only necessary to rotate the ring 32 in the proper direction, and the rotatable support, consisting of the disks or heads 12, 13 and 14 and the web 15 will be rotated on the shaft 11, to bring the odometers in succession into reading position. Mechanism is also provided for preventing accidental rotation of the support, said mechanism consisting of a spring pawl 43, which engages the teeth of the series 31. This pawl does not impede the rotation of the ring in either direction, but it will prevent accidental displacement of the ring and of the rotatable support. The indications on the speedometer are always accessible through the opening 6, and only a glance is needed to read said indications.

The odometer 17ª, while of similar construction to the odometers 17, is used for a somewhat different purpose. This odometer is a signaling or indicating device in function, and the said odometer normally stands at the reading opening 7. Whenever the rotatable support is turned for any purpose to move the odometer 17ª away from the reading opening 7, the motion of the support should be reversed to bring the said odometer back into reading position, for the said odometer is, as before stated, an indicating odometer for indicating to the driver that it is time to attend to certain necessary details of operation.

At the reading opening 7 there is mounted a series of shutters 45. Each of these shutters is adapted to cover that portion of the number wheel of the odometer 17ª which is at the opening 7, and as many shutters are provided as there are number or counting wheels on the odometer. The shutters are guided by guides 47 arranged parallel on the inner surface of the web 15, and of the extension 16, at that slot 42 which is adjacent to the odometer 17ª, and these shutters 45 are of a length to extend transversely of the reading opening 7 and of the slot 42 adjacent to the odometer 17ª, to cover the indications on the odometer.

Each shutter 45 is normally held in position free of the opening 42 by means of a pin 48, which engages a recess or depression 49 in the inner face of the web 15 on the extension 16 above the opening 42. Each pin 48 is connected to one end of a plate spring 50 which is secured to the shutter, and the spring normally holds the pin in engagement with the recess or depression. The shutters are adapted to be moved down in position to cover the adjacent number wheels, by means of a spring pressed pin 60 in the periphery of the adjacent number wheel. Each of these pins 60 is normally pressed outward by a spring 61 arranged within the radial recess 62 which carries the pin, and the pin is adapted to engage an opening 63 in the lower end of the shutter. The shutters 45 move loosely in the guides 47, so that there is no binding, and a stop 64 is provided beneath the opening 42 adjacent to the odometer 17ª for limiting the downward movement of the respective shutters. This stop may be arranged to limit the motion of all the shutters, or each shutter may be provided with a stop as may be desired, and the stops are below the opening 42 adjacent to the odometer 17ª. Preferably, the outer face of each shutter 45 is colored, as for instance red, or each shutter might be colored differently if desired, or it is obvious that the shutters might bear identifying legends on their outer faces, as for instance, Fuel, Oil, Grease, Water, or the like, and in addition there might be indications for the placing of these materials, as for instance, one shutter might bear instructions to refill the radiator, or to refill the fuel tank.

While it is obvious that the odometer 17ª will operate the shutter 45 whatever the position of the odometer with respect to the casing 1—2, such indications or signals could not be read were the odometer 17ª not in position at the reading opening 8, hence it is obvious that to secure the proper operation of the odometer 17ª it is essential that it be in reading position.

The operation of the device as a whole is as follows: When the motor vehicle is in motion, all the odometers and the speedometer will be driven in synchronism from the shaft 39, and the speedometer will indicate the rate of speed at which the vehicle is traveling. Those odometers identified with the tires are set at zero when the tires are first placed. When either of the four tires in use is removed, the odometer pertaining to that tire may be reset, or it may be thrown out of operation, each odometer having means for permitting the same to be disconnected from the operating gear wheel 37. This mechanism is indicated in Fig. 5.

The odometers are normally in gear, that is, they are normally clutched to the pinions 38. When it is desired to release one odometer from the operating mechanism, the shaft

18 pertaining to the odometer is moved against the resistance of the spring 20. When the odometers come into position at the reading opening 8, and the shaft 18 of the particular odometer at the reading opening is moved longitudinally against the resistance of the spring 20, by means of the knurled wheel 25, the odometer will be released from the gear wheel 38.

Normally, the odometer 17ª is retained at reading position at the opening 8. If for instance, it is necessary to fill the radiator when five hundred miles have been traveled, at the moment that the numeral 5 on the hundreds wheel passes into position before the opening 8, and before the opening 42 adjacent to the odometer 17ª, the spring pressed pin 60 will engage the opening 63 of the shutter at the hundreds wheel and will move the shutter over the opening, that is, in position to hide the peripheral surface of the hundreds number wheel. Since these shutters are painted in glaring colors, as for instance red, the attention of the driver will be called to the indication. If desired, the matter to be attended to may be printed, engraved, or otherwise arranged on the outer face of the shutter, in such manner as to be brought into reading position at the time the shutter is moved across the opening. Any other necessary details in the operation of the vehicle may thus be brought to the attention of the driver.

It will be understood that in practice five odometers are identified with the tires, and when a tire is in use, the odometer pertaining thereto is in continuous operation while the vehicle is running. Should for instance, a tire be removed temporarily, as for instance tire 1, and an extra tire be placed, the odometer pertaining to tire 1 will be disconnected from the common operating mechanism, and the odometer pertaining to the extra tire will be connected with the operating mechanism.

When the differential is packed with grease, the odometer pertaining thereto is set at zero, and when a new fuel supply is placed or a new oil supply, or the transmission is packed with grease, the odometers pertaining thereto are set at zero.

The tenth odometer registers the trip mileage, and it is set at zero at the beginning of each trip. The eleventh odometer registers the total mileage, and it may be reset whenever desired. The twelfth odometer 17ª is, as before stated, a signaling or indicating odometer.

With the improved device, the driver or owner of the vehicle has before him at all times a complete record of the operation of the vehicle, showing him the speed attained at the moment in question, the trip mileage, the total mileage, the mileage of each tire, including the extra tire, the mileage made at each repacking of the differential or transmission, and the mileage made on each supply of fuel and oil.

It will be understood that any preferred form of speedometer may be used in connection with the device, the particular construction of the speedometer forming no part of the present invention.

I claim:

1. In combination, a rotatable support carrying an odometer, means for driving the odometer, the support having a series of shutters at the odometer and movable circumferentially over predetermined number wheels to hide the said number wheels, yielding means for normally holding the shutters in inoperative position, and means on the predetermined number wheels arranged at predetermined places for engaging the shutters when a predetermined mileage has been attained, to move the shutters into operative position.

2. In combination, a rotatable support carrying a series of odometers, and a common driving means for the series of odometers, means in connection with the support for bringing the odometers in succession into reading position, means mounted at the reading position of the odometers and engaged by the odometers as they come into reading position, and having interengaging means for permitting the odometer to be disengaged from the operating means and for afterward setting the odometer.

3. In combination, a casing having a reading opening, a rotatable support in the casing, a series of odometers mounted on the support, a common driving means for the odometers, means in connection with the support and operable from outside of the casing for bringing the odometers in succession to the reading opening, means adjacent to the reading opening and engaged by the odometers as they come into reading position, the said means being mounted for movement with respect to the driving means to first release the odometers from the driving means and to afterward reset the odometers.

4. In combination, an odometer, a support for the odometer having a reading opening, a series of shutters mounted to move peripherally of the odometer at the reading opening to conceal the adjacent number wheel, releasable means for holding the shutters in inoperative position, and means on the number wheels for engaging the shutters when the number wheels have moved a predetermined distance to move the shutters over the reading opening, said means being releasable when the predetermined numeral has passed the reading opening.

5. In combination, an odometer, a support for the odometer having a reading opening, a series of shutters mounted to move peripherally of the odometer at the reading opening to conceal the adjacent number wheel, releasable means for holding the shutters in adjusted position, and means on the number wheels for engaging the shutters when the number wheels have moved a predetermined distance to move the shutters over the reading opening.

6. In combination, an odometer, a driving means for the speedometer and the odometer, a support for the odometer, said support having a reading opening, and shutters mounted at the opening and adapted to cover the indications of predetermined number wheels of the odometer, each shutter being normally held in inoperative position, and the holding means being releasable, and releasable means on the predetermined number wheels for engaging the adjacent shutters to move them over the reading opening when certain predetermined numerals on the number wheels are at the opening and being releasable to permit the number wheels to move without interference from the shutters.

7. In combination, a rotatable support, a series of odometers mounted on the support, a common driving means for the odometers, means for rotating the support to bring the odometers in succession to reading position, and relatively fixed means at reading position arranged to be engaged by the odometers as they come into reading position, the said means being movable with respect to the odometers to release the odometers from the driving means.

MARVIN SMITHEY.

Witnesses:
VIRGINIA H. SMITHEY,
GRACE B. MALLORY.